2,902,468
METHOD OF POLYMERIZING HYDROXYLATED SILOXANES

Peter Fianu, Midland, Mich., assignor to Dow Corning Corporation, Midland, Mich., a corporation of Michigan No Drawing. Application June 2, 1958
Serial No. 738,951

2 Claims. (Cl. 260—46.5)

This invention relates to a method of polymerizing organosilicon compounds having silicon-bonded hydroxyl groups.

There are two basic commercial ways of polymerizing organosiloxanes. One of these is by rearrangement of siloxane linkages. This method involves the use of a bond rearranging catalyst such as strong alkalies or strong acids. By this method one can polymerize cyclic siloxanes to high molecular weight gums. This method is widely used commercially but it suffers from the disadvantage that the siloxane bonds of the high polymer will rearrange to regenerate the cyclic starting materials. Consequently, this method inherently gives a certain proportion of cyclic products in the final polymer.

Another method of polymerizing siloxanes is through the condensation of silicon-bonded hydroxyl groups. This method works quite well in the preparation of siloxane resins, but it is not so suitable for the preparation of siloxane gums used in making rubbers. The reason is that it has proved very difficult to obtain sufficient condensation of the hydroxyl groups to carry the siloxane to high molecular weight polymers.

It is the object of this invention to provide a novel method for polymerizing hydroxyl-containing siloxanes which will give high molecular weight polymers in reasonable lengths of time. Another object is to provide a method for polymerizing siloxanes without the accompanying rearrangement of the siloxane bond to give low molecular weight polymers. Another object is to provide a novel method of curing siloxanes. Other objects and advantages will be apparent from the following description.

This invention relates to a method of polymerizing hydroxyl-containing organosilicon compounds which comprises contacting (1) an organosilicon compound having an average of from 1 to 3 inclusive substituent radicals of the group consisting of hydrogen, monovalent hydrocarbon and halogenated monovalent hydrocarbon radicals, per silicon atom, and at least one silicon-bonded hydroxyl group per molecule, any remaining valences of the silicon being satisfied with oxygen atoms and (2) a compound of the formula

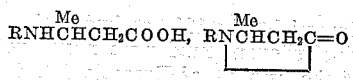

and

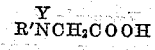

where R is a monovalent aliphatic hydrocarbon radical of 5 to 30 inclusive carbon atoms and R' is an aliphatic hydrocarbon acyl group of 5 to 30 inclusive carbon atoms and Y is methyl or hydrogen, until the desired degree of polymerization is obtained.

The process of this invention is equally useful for the preparation of polymers and copolymers of organosilicon compounds. For example, the procedure can be used to prepare a homopolymer of dimethylpolysiloxane in which case the starting material would be a hydroxylated dimethylsiloxane or diol, or it can be used to prepare copolymers of siloxanes. For example, a mixture of hydroxylated dimethylsiloxane and a hydroxylated phenylmethylsiloxane can be contacted with one of the catalysts (2) to obtain the desired copolymer.

The method of this invention is applicable to any siloxane having at least one silicon-bonded hydroxyl group per molecule. The hydroxylated organosiloxane can be made up of units of the formula $R''SiO_{3/2}$, $R''_2SiO$ and $R''_3SiO_{.5}$ together with limited amounts of $SiO_2$ units. It should also be understood that the starting organosilicon compound can be a monomeric silanol such as $R''_3SiOH$ or a diol such as $R''_2Si(OH)_2$.

The temperature at which the polymerization of this invention occurs is not critical. The polymerization can proceed at room temperature particularly where the catalyst employed is a lactam of the beta-amino acids. However, the polymerization can also be carried out at elevated temperatures. In general, the higher the temperature the faster the polymerization. However, prolonged heating at excessive temperatures such as 250° C. should be avoided since it tends to decompose the catalyst.

It has also been found that it is advantageous to remove water from the reaction mixture since the appearance of water seems to slow down the polymerization. However, the polymerization will proceed in the presence of moisture albeit at a slower rate.

The relative proportions of organosilicon compound (1) and the catalyst (2) are not critical. However, the proportion of catalyst will affect the rate of reaction up to a point. A desirable range for carrying out the reaction is from .1% by weight catalyst to 5% by weight catalyst. It should be understood, however, that higher or lower amounts of catalyst are operative.

One of the interesting and novel features of this invention is the fact that a hydroxylated siloxane containing SiH groups can be polymerized or copolymerized without appreciably affecting the SiH groups on the silicon. Thus, for example, one may polymerize a siloxane of the formula

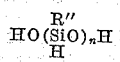

to a high molecular weight material without gelation. Furthermore, one can copolymerize siloxanes such as

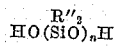

with

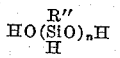

to a high molecular weight gum without gelation. This is an important feature of the present invention because the resulting gums containing the SiH groups can then be cross-linked to rubbers by the use of conventional metal catalysts such as stannous octoate, dibutyltindiacetate and the like.

The process of this invention is applicable to any organosilicon compound having an average of at least one of the defined substituent groups per silicon atom. Thus, for the purpose of this invention, the organosilicon compound (1) can be a monomeric material such as trimethylsilanol, triethylsilanol, phenyldimethylsilanol, diphenylsilanediol or dimethylsilanediol. Organosilicon compound (1) can also be a homopolymeric material such as hydroxylated diethylsiloxanes, phenylmethylsiloxanes or octadecylmethylsiloxanes. In addition, organosilicon compound (1) can be copolymers of any of the defined siloxanes such as copolymers of triethylsiloxanes and $SiO_2$ units, copolymers of chlorophenylmethylsiloxane and dimethylsiloxane, copolymers of monophenylsiloxane, phenylmethylsiloxane and trimethylsiloxane and copolymers of monophenylsiloxane, monomethylsiloxane and diethylsiloxane.

For the purpose of this invention the monovalent hydrocarbon groups attached to the silicon atoms of (1) can be any monovalent hydrocarbon radical such as alkyl radicals such as methyl, butyl, octadecyl or myricyl; alkenyl radicals such as vinyl, allyl or hexenyl; cycloaliphatic radicals such as cyclopentyl, cyclobutyl and cyclohexenyl; aralkyl hydrocarbon radicals such as benzyl and beta-phenylethyl and aromatic hydrocarbon radicals such as phenyl, xenyl, tolyl, naphthyl, anthracyl and xylyl. The siloxane (1) can also contain any halogenated monovalent hydrocarbon radical such as chloromethyl, trifluorovinyl, tetrachlorophenyl, pentabromoxenyl, trifluoropropyl, tetrafluorocyclobutyl, α,α,α-trifluorotolyl and iodophenyl.

The catalyst (2) employed in this invention can be any beta-aminobutyric acid of the formula

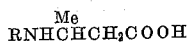

or any lactam of such acid of the formula

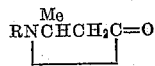

in which R is as above defined. The substituted beta-aminobutyric acids can be prepared by reacting crotonic acid with the corresponding amines of the formula $RNH_2$. These products are commercially available and some of them appear under the name Coco-beta-aminobutyric acids.

The lactam may be prepared from the corresponding acid by heating at about 100° C. This causes dehydration of the acid to give the lactam.

For the purpose of this invention R can be any aliphatic hydrocarbon radical of from 5 to 30 carbon atoms such as pentyl, pentenyl, undecyl, undecenyl, heptadecyl, heptadecenyl, $C_{21}H_{42}$ and $C_{21}H_{41}$.

In addition, catalyst (1) can be an alpha-amino acid of the formula

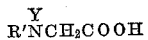

where R′ is an acyl radical of 5 to 30 carbon atoms and Y is hydrogen or methyl. These materials can be prepared by reacting glycine or sarcosine with an acyl chloride.

Specific examples of such materials are N-caproyl glycine, N-caproyl sarcosine, N-palmityl sarcosine, N-oleyl glycine, N-behenyl glycine and N-linoleyl glycine.

The process of this invention is useful in the preparation of high polymers suitable for the manufacture of silicone rubbers. It is also useful in the curing of resinous siloxanes (that is siloxanes having less than two organic groups per silicon) which may be applied as coatings for electrical conductors or as protective coatings for wood and metal surfaces.

The following examples are illustrative only and should not be construed as limiting the invention which is properly delineated in the appended claims. In the specification and claims Me is methyl.

*Example 1*

20 g. of a copolymer of .5 mol percent monomethylsiloxane and 99.5 mol percent dimethylsiloxane, which copolymer contained 1.22% by weight silicon-bonded hydroxyls, were mixed with 2 drops of a mixture of beta-aminobutyric acid derivatives of the formulae

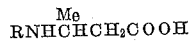

in which the percent by weight of the various acids corresponding to various R groups (as defined below) was as follows:

| R: | Percent acid |
|---|---|
| $C_6H_{13}$ | .2 |
| $C_8H_{17}$ | 8.0 |
| $C_{10}H_{21}$ | 7.0 |
| $C_{12}H_{25}$ | 48.0 |
| $C_{14}H_{29}$ | 17.5 |
| $C_{16}H_{33}$ | 8.8 |
| $C_{18}H_{37}$ | 2.0 |
| $C_{18}H_{35}$ | 6.0 |
| $C_{18}H_{33}$ | 2.5 |

The mixture was heated at 150° C. and an increase in viscosity was obtained.

*Example 2*

1 part by weight of the catalyst of Example 1 was mixed with 100 parts by weight of a 4300 cs. hydroxyl end-blocked dimethylpolysiloxane fluid. The mixture was heated under vacuum 22 hours at 100 to 180° C. At the end of this time the viscosity was 1,080,000 cs.

*Example 3*

100 parts by weight of a 4300 cs. hydroxyl end-blocked dimethylpolysiloxane fluid were mixed with 1 part by weight of a mixture of beta-amino lactams of the formula

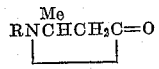

in which the percent by weight of the various lactams corresponding to varying R groups is as follows:

| R: | Percent acid |
|---|---|
| $C_6H_{13}$ | .2 |
| $C_8H_{17}$ | 8.0 |
| $C_{10}H_{21}$ | 7.0 |
| $C_{12}H_{25}$ | 48.0 |
| $C_{14}H_{29}$ | 17.5 |
| $C_{16}H_{33}$ | 8.8 |
| $C_{18}H_{37}$ | 2.0 |
| $C_{18}H_{35}$ | 6.0 |
| $C_{18}H_{33}$ | 2.5 |

The mixture was heated under vacuum for 6 hours at 80 to 160° C. The viscosity increased to 2,800,000 cs.

*Example 4*

1000 parts by weight of a 3400 cs. hydroxyl end-blocked dimethylpolysiloxane fluid and 1 part by weight of the catalyst of Example 3 were placed under vacuum and allowed to stand at room temperature for 16 hours. The viscosity of the fluid rose to 16,200 cs. After 166 hours the viscosity was 165,000 cs.

30 g. of the 16,200 cs. fluid was removed and 1 drop of acetic acid was added. The mixture was allowed to stand at atmospheric pressure at room temperature and after 166 hours the viscosity was 422,000 cs.

*Example 5*

100 parts by weight of a 1000 cs. hydroxyl end-blocked phenylmethylpolysiloxane fluid were mixed with 1 part by weight of the catalyst of Example 1 and heated at 100° C. for 24 hours. The viscosity rose to 1,000,000 cs.

*Example 6*

A mixture of 100 parts of a 4000 cs. hydroxyl end-blocked dimethylpolysiloxane and .05 part by weight of a hydroxylated methylhydrogenpolysiloxane was mixed with .1 part of the catalyst of Example 3. The mixture was heated at 100° C. and the siloxanes polymerized rapidly to a gum.

The resulting gum contained SiH groups and is polymerized to an insoluble, infusible rubber by curing with stannous octoate.

Example 7

100 parts by weight of a 45 cs. fluid copolymer of .5 mol percent monomethylsiloxane and 99.5 mol percent dimethylsiloxane which contained 1.22 weight percent silicon-bonded hydroxyl groups were mixed with .5 part by weight N-lauryl sarcosine and the mixture was heated at 160° C. for 16 hours. The product gelled.

Example 8

High polymers are obtained when a 1000 cs. hydroxyl end-blocked 3,3,3-trifluoropropylmethylsiloxane is employed in the method of Example 1.

Example 9

Curing is obtained when a copolymer containing silicon-bonded hydroxyl groups having the composition 20 mol percent monomethylsiloxane, 20 mol percent monoxenylsiloxane, 3 mol percent monooctadecylsiloxane, 7 mol percent monovinylsiloxane, 25 mol percent chlorophenylmethylsiloxane and 25 mol percent cyclohexylsiloxane is heated with 1 part by weight of the catalyst of Example 3 at 150° C.

Example 10

30 parts by weight of a copolymer of Me$_3$SiO$_{.5}$ and SiO$_2$ having a methyl to silicon ratio of 1.2, which copolymer contained silicon-bonded hydroxyl groups, was dissolved in 100 parts by weight of a hydroxylated fluid copolymer of 99.95 mol percent dimethylsiloxane and .05 mol percent monomethylsiloxane. 1 part of the catalyst of Example 1 was added to the solution and the mixture heated. It cured in less than 30 minutes at 150° C. and in less than 1 hour at 100° C.

Example 11

Hexamethyldisiloxane is formed when 100 parts of trimethylsilanol is mixed with 1 part of

and the mixture is allowed to stand at room temperature.

Example 12

Polymerization takes place when 100 parts by weight of a 4300 cs. hydroxyl end-blocked dimethylpolysiloxane is mixed with 1 part by weight of the following catalysts and the mixture is heated at 100° C. under vacuum.

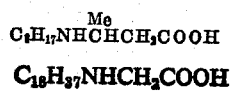

C$_{18}$H$_{37}$NHCH$_2$COOH

C$_{12}$H$_{21}$NHCH$_2$COOH

That which is claimed is:

1. A method of polymerizing hydroxyl-containing organosilicon compounds which comprises contacting (1) an organosilicon compound having an average of from 1 to 3 inclusive substituent groups selected from the group consisting of hydrogen, monovalent hydrocarbon radicals and monovalent halogenated hydrocarbon radicals, per silicon atom, and at least one SiOH group per molecule, any remaining valences of said organosilicon compound being satisfied with oxygen atoms and (2) a compound selected from the group consisting of those of the formula

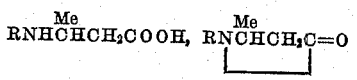

and

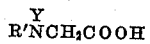

where R is a monovalent aliphatic hydrocarbon radical of 5 to 30 inclusive carbon atoms, R' is an aliphatic hydrocarbon acyl group of 5 to 30 carbon atoms and Y is of the group consisting of methyl and hydrogen, until the desired degree of polymerization is obtained.

2. A method comprising copolymerizing a siloxane consisting essentially of units of the formula R''$_2$SiO with a siloxane consisting essentially of units of the formula R''HSiO, both of which siloxanes contain silicon-bonded hydroxyl groups, and in which R'' is selected from the group consisting of monovalent hydrocarbon radicals and halogenated monovalent hydrocarbon radicals, by contacting a mixture of the siloxanes with a compound selected from the group consisting of

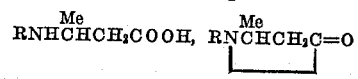

and

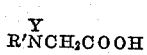

in which R is a monovalent aliphatic hydrocarbon radical of 5 to 30 inclusive carbon atoms, R' is an aliphatic hydrocarbon acyl group of 5 to 30 inclusive carbon atoms and Y is selected from the group consisting of methyl and hydrogen, until the desired degree of polymerization is obtained.

No references cited.

UNITED STATES PATENT OFFICE
CERTIFICATE OF CORRECTION

Patent No. 2,902,468

September 1, 1959

Peter Fianu

It is hereby certified that error appears in the printed specification of the above numbered patent requiring correction and that the said Letters Patent should read as corrected below.

Column 4, line 49, for "1000 parts" read -- 100 parts --.

Signed and sealed this 8th day of March 1960.

(SEAL)
Attest:

KARL H. AXLINE
Attesting Officer

ROBERT C. WATSON
Commissioner of Patents